May 9, 1967  O. W. KEHM  3,318,524
AIRFLOW REGULATOR
Filed June 21, 1965
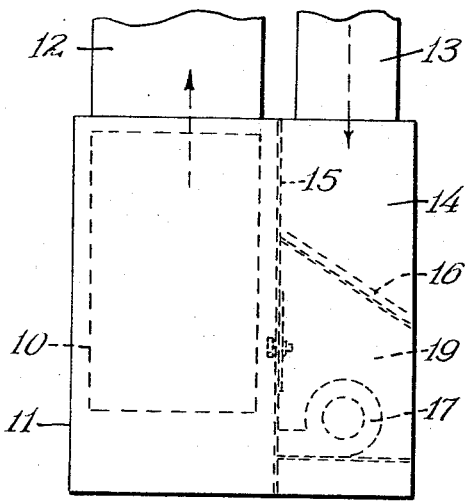
FIG. 1
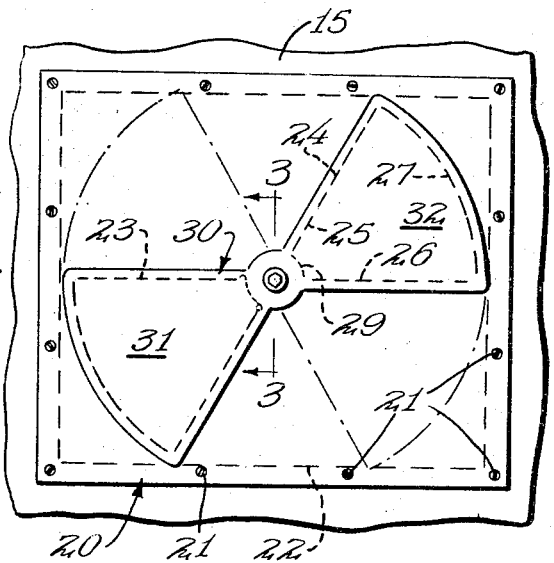
FIG. 2
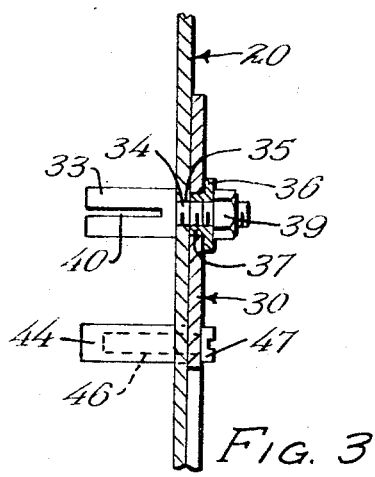
FIG. 3
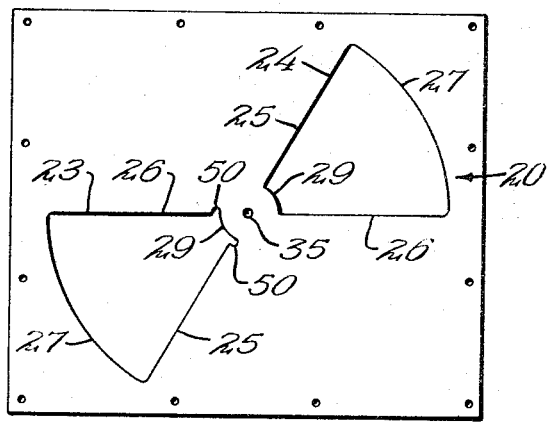
FIG. 4
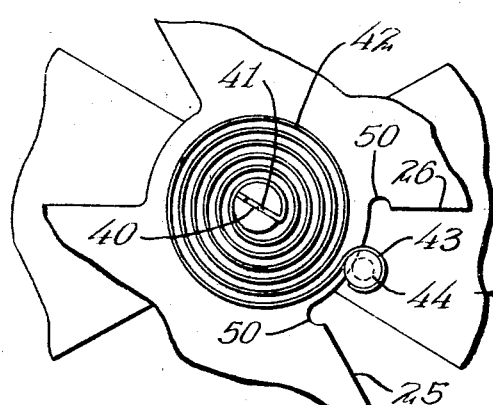
FIG. 6
FIG. 5
INVENTOR
ORLO W. KEHM
BY
ATTORNEY

United States Patent Office 3,318,524
Patented May 9, 1967

3,318,524
AIRFLOW REGULATOR
Orlo W. Kehm, 1851 34th St. NW.,
Rochester, Minn. 55901
Filed June 21, 1965, Ser. No. 465,288
8 Claims. (Cl. 236—10)

This invention relates to an improvement in air-flow regulator and deals particularly with a device for maintaining a more uniform temperature in a house or building having a forced-air heating unit and which is also capable of effecting economies in the operation of the furnace. Forced air heating systems usually embody heat exchange units which are heated by gas or oil. A standard method of operation controls the heat source by a temperature differential thermostat. The fan cycle is controlled by a high-low temperature control in the heat chamber. The volume of air which is circulated is based upon the total volume of the space being heated.

For the average heating installation, the above elements of operation are fixed at predetermined values to maintain a comfort range for a basic outside temperature during the heating season. While such an arrangement is widely used, the standard specifications result in operating variations that effect the comfort range and operating efficiency. The most critical of these are as follows:

(1) Increased temperature variations in some rooms of the heated area because of the too high or low volume of air being circulated when outside temperatures are either above or below the basic means average outside temperature.

(2) In periods of high demand, the high bonnet temperature of the heat exchanger causes a heat loss up the stack. High temperature of the delivered air results in a change in the comfort range because of increased variations of the temperature from floor to ceiling.

(3) Relatively high "off" temperature for the blower to eliminate "cold blast" at the end of the heat cycle leaves residual heat in the heat chamber which is lost up the stack.

(4) In periods of low demand, the short fan cycle at relatively high heat chamber temperature causes a change in the comfort range because of the increased variations of floor to ceiling temperatures.

It is an object of the present invention to control the air flow through the heat chamber during the demand cycle, thereby regulating the high-low temperature of the air supplied to the heated area. This is accomplished by by-passing a part of the volume of air supplied by the blower fan from the heat chamber to the cold air return of the system. This causes a materially higher temperature to exist in the air blown through the heat ducts and into the various rooms at the beginning of the blower cycle. At the same time, the air by-passed from the heat chamber into the cold air return increases the temperature of the air entering the blower chamber.

A feature of the present invention resides in the provision of an adjustable means by by-passing a part of the volume of the air supplied by the blower from the heat chamber to the cold air return of the system. In the means illustrated, a plurality of sector-shaped apertures are provided in a baffle wall between the heat chamber and the air-return duct arranged about a common center. These sector-shaped openings may be covered to a greater or lesser degree by a butterfly damper having sector-shaped wings which, in one extreme position, completely close the openings in the baffle. This damper is rotatably supported upon a central pivot which permits the damper to be pivoted between two extreme positions. In one extreme position, the baffle openings are completely closed and in the other extreme position, the apertures are entirely open. A motor is provided which senses the temperature changes in the heat chamber and acts to cause the damper to swing toward open position as the heat in the heating chamber is at a relatively low temperture. The baffle openings are fully opened at low temperature and a maximum of air is by-passed through these openings into the cold air return. This operation prevents a sudden blast of air from passing through the heating ducts, by reducing the actual volume of air flowing to the heating ducts at the beginning of the blower cycle.

A feature of the present invention lies in the fact that the temperature of the residual air in the heat chamber during the "off" cycle has been reduced, resulting in lower stack losses.

A further feature of the present invention allows adjustment for a quicker response to the "demand cycle" and a longer cycle of controlled circulation of "air conditioner to the comfort range" throughout the heated area.

A feature of the present invention resides in the provision of an air-control system which gradually decreases the amount of air by-passing to the cold air return as the temperature in the heating chamber increases. This is caused by the motor which senses variations in temperature in the heating chamber, and gradually pivots the damper into closed position.

A further feature of the improved form of construction of the apparatus lies in the fact that the motor which actuates the damper may comprise merely a coil of bimetallic material having its inner end fixed at the pivot of the damper, and having its outer end connected to the damper by means of a connecting stud or the like, which passes through one of the baffle openings. The degree of pivoting of the damper may be limited by the walls of the baffle opening through which the connecting means extends, thus preventing over-travel of the damper in either direction.

These and other objects and novel features of the present invention will be more clearly and fully setforth in the following specification and claims:

In the drawings forming a part of the specification;

FIGURE 1 is an elevational view of a heating unit showing the return air-duct associated therewith.

FIGURE 2 is an elevational view of a baffle plate and damper illustrated as connecting the return air-duct and the heating chamber.

FIGURE 3 is a sectional view through the pivot axis of the damper, the position of the section being indicated by the line 3—3 of FIGURE 2.

FIGURE 4 is an elevational view of the baffle plate alone.

FIGURE 5 is an elevational view of the damper by itself.

FIGURE 6 is a view showing the motor and baffle plate, with the damper illustrated behind the baffle plate.

FIGURE 1 of the drawings shows the general arrangement of a heating element of the type suitable for the incorporation of the present apparatus. This structure includes a heating exchange unit 10 which is located within a generally hollow housing 11. The upper end of the heat chamber 11 is connected to a vertical extending duct 12 which usually branches to lead to various rooms of the house.

The cold air return is indicated at 13. This cold air return duct extends into the upper end of the return air chamber 14 which may be in side by side relation to the heating chamber 11 and which is separated therefrom by a wall 15. One or a series of filters 16 is provided between the upper and lower ends of the return chamber 14. A blower fan 17 operated by a suitable source of current, removes air from the lower portion 19 of the return air chamber 14 and blows it into the lower end of the heating chamber 11.

As systems of this type are generally conventional in form, the details of construction are not illustrated. However, just in general, the fan or blower 17 removes the air from the lower portion 19 of the return air chamber 14, beneath filter 16 and forces it through or past the heat exchange member 10 which is designed to heat the air to a desired temperature.

In the arrangement illustrated, a rectangular baffle plate 20 is secured by metal screws 21 or the like, to overlie a similarly shaped smaller size aperture 22 in the wall 15 separating the return air chamber 14 and the heat chamber 11. The baffle plate 20 is provided with a pair of sector-shaped openings 23 and 24 extending therethrough, these openings being defined on their opposite edges by diverging lines 25 and 26. The outer periphery of the openings 26 are defined by an arcuate edge 27, and the inner periphery of the openings 24 is also defined by an arcuate edge illustrated at 29.

A butterfly type damper 30 having diametrically opposed sector-shaped blades 31 and 32 is pivotally supported to the baffle plate. As is indicated in FIGURE 3 of the drawings, the pivotal support includes a large diameter end portion 33 and a smaller diameter threaded shank 34. The threaded shank 34 extends through an aperture 35 in the baffle plate 20, and also extends through the baffle plate 30. A washer 36 is provided with a projecting hub 37 which engages against the outer surface of the baffle 20. The damper 30 is freely supported for rotation about the hub 37 of the washer 36. The washer hub is clamped against the outer surface of the baffle plate 20 by means of a nut 39.

As is indicated in FIGURE 3 of the drawings, the large diameter portion 33 of the pivot is diammetrically slit as indicated at 40 to accommodate an end portion 41 of a bi-metallic coil 42. The outer end of the bi-metallic coil 42 is bent into a cylindrical form as indicated at 43 to accommodate a retaining pin 44 having an end which abuts against the inner surface of the damper 30. As indicated in FIGURE 3 of the drawings, the pin 44 is provided with an internally threaded socket as indicated at 46 and is designed to accommodate a fastening screw 47 which secures the pivot pin 44 in fixed relation to the damper 30 for rotate of movement therewith.

As is indicated in FIGURE 4 of the drawings, the diverging edges 25 and 26 of the sector-shaped aperture through which the bolt 47 extends may be notched as indicated at 50 to permit a greater extent of travel of the damper 30.

In operation, the damper 30 is set so as to completely expose the diammetrically opposed apertures 23 and 24 when the structure is at room temperature. In this position, the damper would appear as indicated in broken lines in FIGURE 2. However, as the temperature of the heating chamber increases, the coil 42 acts to swing the damper 30 toward the position shown in full lines in FIGURE 2.

As a result of this operation, when the temperature in the heat chamber is low, the baffle apertures are open, and a maximum percentage of the air from the heating chamber 11 is by-passed to the return air chamber 13. As a result, a lesser volume of air is forced into the heat ducts at the start of the burner cycle, and a lesser volume of air is drawn into the cold air returns. As the temperature in the heating chamber raises, the amount of air by-passed is reduced.

In a typical test installation, after the by-pass damper was installed, the upper limit control of the heater was reduced from 250 degrees F. to 200 degrees F. The blower control was adjusted to turn on at 100 degrees F. instead of the previous 140 degrees F. The "off" temperature of the blower was reduced from 120 degrees F. to 90 degrees F. Room temperatures were adjusted by dampers in the heat ducts to provide a temperature of 70 degrees F. in the two bed-rooms, a temperature of 73 degrees F. in the living room, den, bathroom and kitchen, and a temperature of 70 degrees F. in the basement.

Through a complete heating season in St. Paul, Minn., the following observations were made:

(1) The maximum bonnet temperature of the heat exchange unit was 185 degrees F. at an outside temperature of −20 degrees F.

(2) The "by-pass" function of the device allowed more "usable heat" to be moved from the heat chamber to the heated area with no cold floor drafts at the end of the cycle.

(3) There were no high temperature "heat flashes" at the beginning of the heat cycle.

(4) The longer operating cycle maintained temperature throughout the heated area.

(5) The established lower temperatures in the heat chamber reduced residual heat loss up the stack.

(6) A saving of ten percent was estimated for the heating season as compared with the previous five heating seasons.

In accordance with the patent statutes, I claim:
1. A heating system for heating an area including;
a heat chamber,
a heat exchange unit in said heat chamber,
heating ducts connecting said heat chamber to the area to be heated,
a cold air chamber,
cold air ducts connecting said cold air chamber to the area to be heated,
a blower connected between said cold air chamber and said heat chamber to force air into said heat chamber,
a by-pass passage between said heat chamber and said cold air chamber,
a by-pass damper in said passage movable from passage open position to passage closed position, and
thermostatically controlled means operable upon increases in temperature in said heat chamber to move said damper toward closed position and upon decreases in temperature in said heat chamber to move said damper toward open position.

2. The structure of claim 1 and in which said damper is pivotally supported.

3. The structure of claim 1 and in which said thermostatically controlled means comprises a spirally wound by-metallic element.

4. A heating system for heating an area including
a heat chamber,
a heat exchange unit associated with said heat chamber to heat the air therein,
a cold air chamber,
cold air ducts connecting said cold air chamber with said area to be heated,
a blower connected between said cold air chamber and said heat chamber to force air from said cold air chamber to said heat chamber,
heating ducts means connecting said heat chamber to the area to be heated,
a bypass passage between said cold air chamber and said heat chamber,
a bypass damper in said passage movable from passage open position to passage closed position, and
thermostatically controlled means operable upon increases in temperature in said heat chamber to move said damper toward closed position and upon decreases in temperature in said heat chamber to move said damper toward open position.

5. The structure of claim 4 and in which the heat chamber and the cold air chamber have a common wall therebetween, and in which said common wall includes an aperture forming said bypass passage.

6. The structure of claim 5 and in which said blower is situated in said cold air chamber.

7. The structure of claim 4 in which said by-passage comprises a baffle plate having a plurality of apertures therethrough in angularly spaced relation about a pivot axis, and in which said damper comprises a butterfly valve pivotally supported for movement about said axis.

8. The structure of claim 4 and in which said thermostatically controlled means comprises a by-metallic element connected to said damper for pivoting the damper about said axis.

References Cited by the Examiner

UNITED STATES PATENTS

| | | | |
|---|---|---|---|
| 1,798,431 | 3/1931 | McWilliams | 236—93 |
| 1,978,488 | 10/1934 | Donovan | 236—93 |
| 2,035,974 | 3/1936 | McWilliams | 236—93 |
| 2,721,704 | 10/1955 | Patrick | 236—10 |

EDWARD J. MICHAEL, *Primary Examiner.*